United States Patent
Muhanna et al.

(10) Patent No.: US 12,155,462 B2
(45) Date of Patent: Nov. 26, 2024

(54) OPTIMIZING NODE LOCATION IN A BATTERY MANAGEMENT SYSTEM

(71) Applicant: TEXAS INSTRUMENTS INCORPORATED, Dallas, TX (US)

(72) Inventors: Tariq Muhanna, Garland, TX (US); Ariton Xhafa, Plano, TX (US); Naveen Kumar Kala, Austin, TX (US); Mathew Giaramita, New York, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 8 days.

(21) Appl. No.: 17/823,291

(22) Filed: Aug. 30, 2022

(65) Prior Publication Data

US 2024/0072920 A1 Feb. 29, 2024

(51) Int. Cl.
*H04J 3/06* (2006.01)
*H04L 12/44* (2006.01)

(52) U.S. Cl.
CPC .......... *H04J 3/0647* (2013.01); *H04J 3/0658* (2013.01); *H04L 12/44* (2013.01)

(58) Field of Classification Search
CPC ........ H04J 3/0647; H04J 3/0658; H04L 12/44
See application file for complete search history.

(56) References Cited

U.S. PATENT DOCUMENTS

| 8,335,203 | B2 * | 12/2012 | Trainin ............ H04B 7/2643 370/347 |
| 9,293,935 | B2 | 3/2016 | Lee |
| 11,038,216 | B2 | 6/2021 | Kwon |
| 11,483,824 | B2 | 10/2022 | Lee |
| 2002/0034959 | A1 * | 3/2002 | Jamieson ............ H04W 68/025 455/500 |
| 2003/0174049 | A1 * | 9/2003 | Beigel ................ G06K 19/0723 340/5.61 |
| 2006/0007876 | A1 * | 1/2006 | Qian ..................... H04L 1/1692 370/320 |

(Continued)

OTHER PUBLICATIONS

Texas Instruments. CC2642R SimpleLink(TM) Bluetooth(R) 5.2 Low Energy Wireless MCU. SWRS194H—Jan. 2018—Revised Mar. 2021. 66 pages.

(Continued)

*Primary Examiner* — Christine Ng
(74) *Attorney, Agent, or Firm* — Carl G. Peterson; Frank D. Cimino

(57) ABSTRACT

A battery management system (BMS) is presented herein. The BMS has a master node. The master node includes a master transceiver and a controller communicably coupled to the master transceiver. The BMS has a plurality (n) of slave nodes. Each slave node of the n slave nodes includes a slave transceiver for communicably coupling to at least one battery monitor. The controller of the BMS is configured to direct the master transceiver to establish a communications network with the n slave nodes. To establish the communications network, the controller is also configured to respectively assign each of the n slave nodes to non-overlapping time slots of a superframe. The controller is further configured to direct the master transceiver to consecutively receive uplink (UL) transmissions from the n slave nodes in the non-overlapping time slots of the superframe.

20 Claims, 7 Drawing Sheets

(56) References Cited

U.S. PATENT DOCUMENTS

| | | | |
|---|---|---|---|
| 2009/0313310 A1* | 12/2009 | Thome | H04W 84/18 707/999.203 |
| 2016/0044682 A1* | 2/2016 | Djakovic | H04L 9/0825 370/330 |
| 2016/0218866 A1 | 7/2016 | Patil et al. | |
| 2016/0295521 A1* | 10/2016 | Grayson | H04W 4/02 |
| 2016/0378350 A1* | 12/2016 | Motwani | G06F 21/80 711/154 |
| 2017/0186308 A1* | 6/2017 | Aplin | E05B 41/00 |
| 2018/0124778 A1* | 5/2018 | Verma | H04W 72/21 |
| 2019/0273293 A1 | 9/2019 | Kim et al. | |
| 2020/0146097 A1* | 5/2020 | Haartsen | H04M 1/6066 |
| 2020/0396688 A1 | 12/2020 | Hong | |
| 2021/0043983 A1 | 2/2021 | Choi | |
| 2021/0084675 A1 | 3/2021 | Aijaz | |
| 2021/0306993 A1* | 9/2021 | Raza | H04J 3/0661 |
| 2022/0091062 A1 | 3/2022 | Gullapalli | |
| 2022/0113356 A1 | 4/2022 | Kasselman | |
| 2022/0179001 A1 | 6/2022 | Park | |
| 2022/0332213 A1 | 10/2022 | Xhafa | |
| 2022/0352563 A1* | 11/2022 | Park | H01M 10/425 |
| 2023/0077413 A1* | 3/2023 | Jiao | H04W 76/10 370/329 |

OTHER PUBLICATIONS

Xhafa, et al., "Enabling Data Integrity in Wireless Devices Connected to Battery Monitor", Texas Instruments, Jun. 4, 2019, 4 pgs.

EM Microelectronic, EM9301 Datasheet, 2018, 51 pages (Year: 2018).

Song et al. "The AES-CMAC Algorithm", National Institute of Standards and Technology (NIST), 2006, "https://www.rfc-editor.org/ rfc/pdfrfc/rfc4493.txt.pdf", 20 pages (Year: 2006).

Nordic semiconductor, nRF25840 Datasheet, 2018, 551 pages (Year: 2018).

International Standard, ISO 26262-1, "Road vehicles—Functional Safety", International Organization for Standardization, Second Addition, Dec. 2018, 42 pgs.

Xhafa, et al., "Wireless Protocol for Battery Management Systems", Texas Instruments, Jun. 4, 2019, 6 pgs.

Xhafa, et al., U.S. Appl. No. 17/820,441, "Mesh Network During Keep Alive in Wireless Battery Management System", filed Aug. 17, 2022.

Kunduru, et al., U.S. Appl. No. 17/823,138, "Multiple Primary Nodes for Wireless Battery Management System Robustness", filed Aug. 30, 2022.

* cited by examiner

OPTIMIZING NODE LOCATION IN A BATTERY MANAGEMENT SYSTEM

BACKGROUND

Energy storage devices like battery cells find applications in wide ranging fields. Battery technology is ever evolving. One measure of performance for energy storage devices like batteries relates to storage capacity per unit weight (e.g., Ah/kg). Some energy storage devices are manufactured and used in systems such as electric vehicles (EV) as one or more battery modules having associated battery monitoring electronic components. Some known examples of such monitoring components require wired communication devices and thus also wires, which can add weight to the battery modules and thereby decrease their overall storage capacity per unit weight.

Energy storage devices may also require period maintenance or repair. As used in EVs, for example, battery modules may be designed to be compact to enable several of them to be safely and conveniently positioned in or on an EV's chassis. Maintenance of known battery modules may require trained technicians and may represent a substantial cost in terms of time and money. In at least some known battery modules, battery monitoring components may utilize wireless communication protocols to receive commands from, and transmit data to, a central controller. Although wireless communication protocols in such known examples may beneficially reduce weight by eliminating wired connections, it may be difficult for users like maintenance technicians to identify or otherwise determine which of a plurality of battery monitors and associated battery cell(s) are tied to particular useful data indicating they require repair or replacement. This difficulty may be a factor that drives up costs of maintenance for owners of systems like EVs having energy storage devices with associated monitoring devices.

SUMMARY

A battery management system (BMS) is presented herein. The BMS has a master node. The master node includes a master transceiver and a controller communicably coupled to the master transceiver. The BMS has a plurality (n) of slave nodes. Each slave node of the n slave nodes includes a slave transceiver for communicably coupling to at least one battery monitor. The controller of the BMS is configured to direct the master transceiver to establish n single node networks with the n slave nodes. To establish the communications network, the controller is also configured to respectively assign each of the n slave nodes to non-overlapping time slots of a superframe. The controller of the BMS is further configured to direct the master transceiver to consecutively receive uplink (UL) transmissions from the n slave nodes in non-overlapping time slots of a superframe.

Further, a method of operating a BMS is presented. The method includes establishing n single node networks with n slave nodes of the BMS. The establishing step of the method includes respectively assigning each of the n slave nodes to non-overlapping time slots of a superframe. The method also includes consecutively receiving UL transmissions from the n slave nodes in the non-overlapping time slots of the superframe.

Further, one or more non-transitory computer readable media is disclosed. The one or more non-transitory computer readable media may be embodied in a computer program product. The one or more non-transitory computer readable media have stored thereon program instructions, that, when executed by at least one processor, cause a machine to perform the method summarized above.

BRIEF DESCRIPTION OF THE DRAWINGS

Embodiments of the present technology will be described and explained through the use of the accompanying drawings in which.

Figure 1:
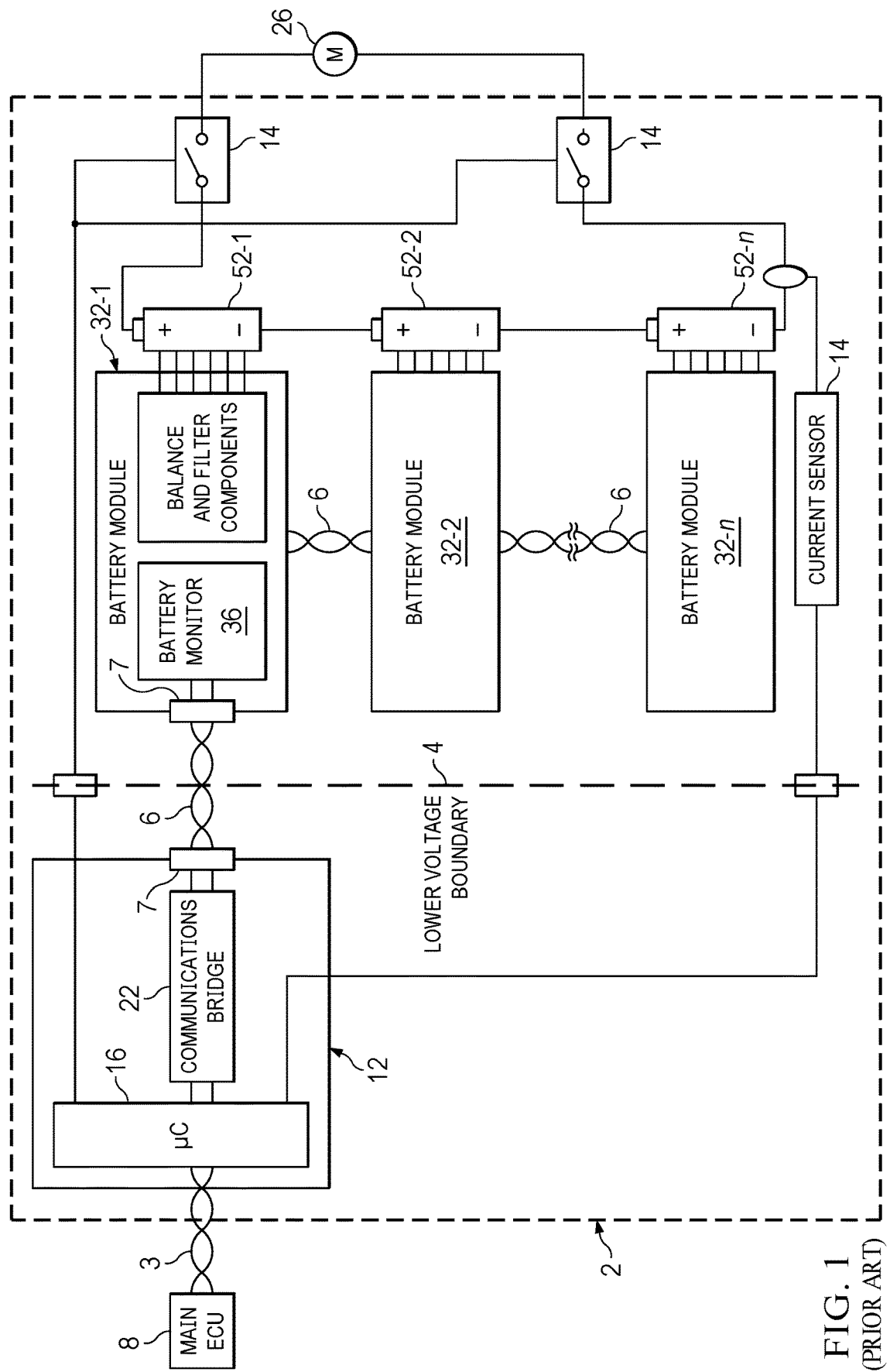
FIG. 1 is a block diagram of a known implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In known battery management system (BMS) designs, slave nodes join the master node's network in a random order. As a result, it may be difficult, if not impossible, to identify/locate a particular slave node for debugging, maintenance or replacement. The present disclosure provides, among other things, an improved BMS design. The BMS disclosed herein may include a master node with a main controller communicably coupled to a master transceiver. BMS according to the present technology may also include a plurality (n) of slave nodes. Each slave node may include a slave transceiver with an associated RF antenna. Each of the slave transceivers may be configured to be communicably coupled to at least one battery monitor.

Each slave transceiver may be capable of transmitting and receiving signals to/from the master transceiver. The transmitted signals from the slave nodes may include data generated by battery monitors. Thus, the master node can form a single network with the n slave nodes in a superframe scheme. A superframe is a minimum structure to achieve low latency communication to accomplish the ends of the present technology as described herein. The superframe according to the present technology may include a plurality of time slots of fixed duration, where two or more of the time slots may have differing functions in the disclosed systems and methods. The time slots together form the superframe, where communications performed between the master node and the several slave nodes occurs in each of the timeslots with a predetermined, and thus also nonrandom and predictable, pattern. Effectively, the single network can be setup separately in the superframe scheme, with one downlink and one uplink allocated to respectively slotted times. In some embodiments, the BMS according to the present technology may form a wireless network, where the master and slave transceivers may include respectively associated radio frequency (RF) antennas.

The formation of the aforementioned single network between the master node and each of the n individual slave nodes in the superframe scheme advantageously enables the controller of the master node to uniquely identify the respective slave nodes with efficient use of computing, communications and memory resources of the BMS. This enables the association of data received from battery monitor(s) associated with a particular slave node more easily as compared to known systems and methods. In embodiments of the BMS according to the present technology that utilize wireless communication, the present technology enables determination of wireless communication performance metrics (e.g., RSSI) to facilitate a user to optimize locations of the plurality of slave nodes relative to the master node to ensure optimal performance of a wireless BMS implementation as applied to, for example and without limitation, an electric vehicle (EV).

Referring now to the drawings, FIG. 1 shows a battery management system (BMS) 2 according a known implementation. The known BMS 2 includes a circuit board or integrated circuit 12 having main processor, e.g., microcontroller (μC) 16, operatively (e.g., communicably) coupled to a communications bridge 22. BMS 2 may be utilized in a variety of practical applications involving one or more energy storage devices, e.g., rechargeable battery cell(s) 52. In known embodiments where BMS 2 is applied to, for example and without limitation, an EV, the main processor 16 may be further operatively (e.g., communicably) coupled to a main electronic control unit (ECU) 8 by way of a wired communications interface 3 such as a controller area network (CAN) interface (also known as a CAN bus).

In the known BMS 2, the main processor 16 may be positioned on a low voltage portion of BMS 2 by way of isolating means 4, where battery cell(s) 52 and associated battery modules 32 are situated on a high voltage side of BMS 2. In the known example shown in FIG. 1, BMS 2 may include a plurality (n) of battery cells (e.g., 52-1, 52-2, . . . , 52-n) with respectively coupled battery modules (e.g., 32-1, 32-2, . . . , 32-n). Each battery module 32 in BMS 2 may include a battery monitor 36, which may include balance and filter components. In the case of BMS 2 applied to EVs, main processor 16 may also be operatively coupled by way of, e.g., control lines, to a load 26 including an electric motor "M" and associated motor driver and/or sensor electronics 14.

The main processor 16 of BMS 2 may be further operatively coupled to the battery monitor(s) 36 by way of a communication bridge 22 and via wired connections 6. The wired connections 6 between main processor 16 and the battery monitors 36 enable reporting, logging and monitoring of battery cell 52-related data to, for instance, the main ECU 8 to facilitate maintaining the battery cells 52, and thus also the EV, in good working order.

In BMS 2, battery monitor(s) 36 associated with each battery module 32 may report voltage, temperature, and additional register settings to the main processor 16. The main controller 16 may send battery cell 52 balancing commands or other maintenance commands for the individual cells 52 or a group of cells 52 and the battery health monitoring devices (not shown in FIG. 1). In the known BMS 2, wiring 6 between battery modules 32 may be done via isoSPI, twisted pair cabling, or others. Wiring 6 may also require isolating means 4 (e.g., choke capacitors 7) for isolation/protection between high and low voltage sides of BMS 2.

Manufacturers of BMSs and EVs have developed wireless solutions such as BMS 2 shown in FIG. 1. As used, for example, in an EV, a wireless BMS can reduce cost and/or weight, as well as simplify maintenance and repair procedures for the battery cell(s) 52, modules 32 and monitors 36.

Figure 2:
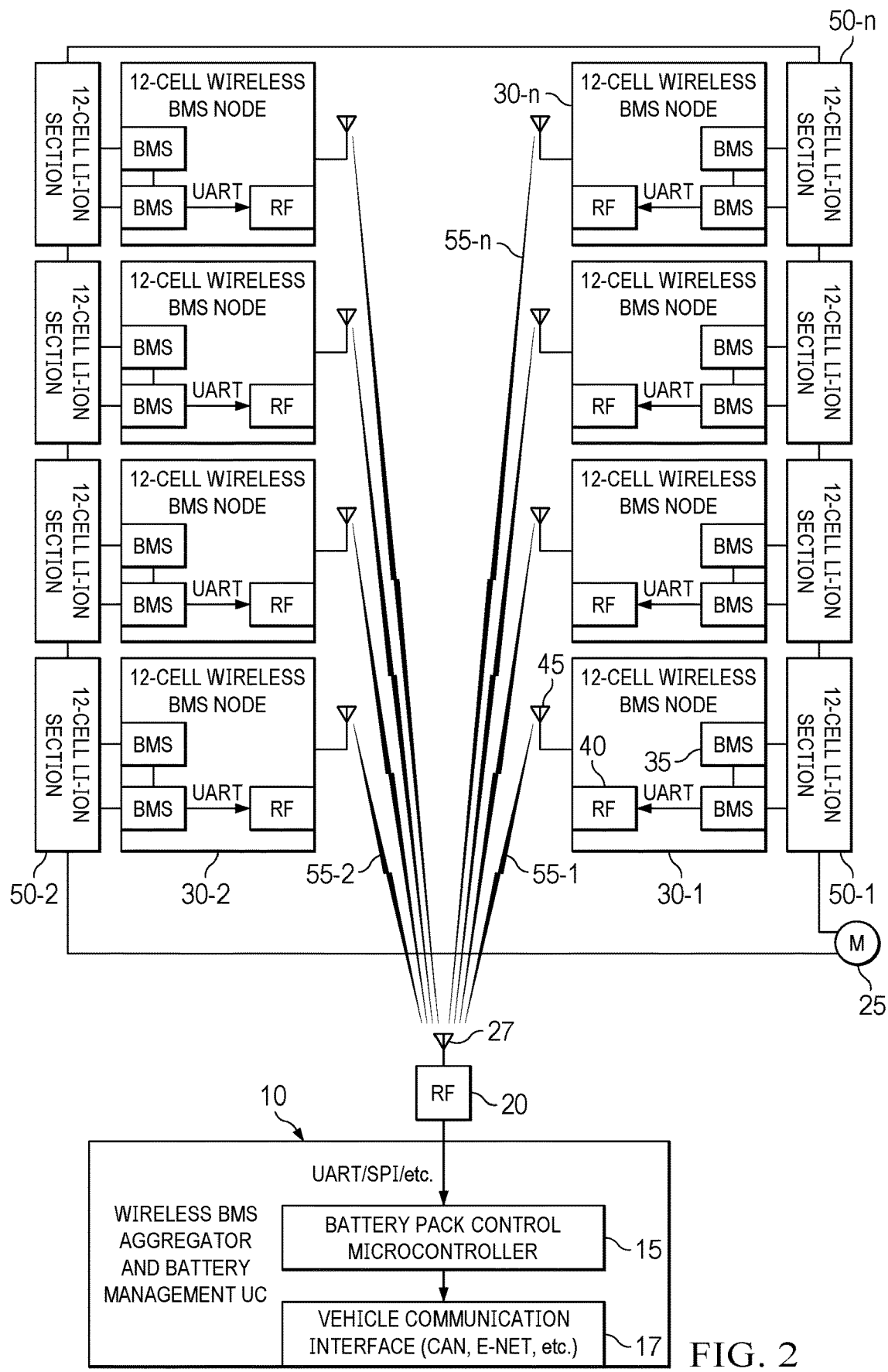
FIG. 2 is a block diagram of an implementation.

FIG. 2 shows a wireless battery management system (WBMS) 1 according to an implementation. The WBMS 1 may include a circuit board or integrated circuit 10 having master processor, e.g., μC 15, operatively (e.g., communicably) coupled to a master wireless transceiver 20 having an associated radio frequency (RF) antenna 27. Like BMS 2, WBMS 1 may be utilized in a variety of practical applications involving one or more energy storage devices (e.g., rechargeable battery cell(s) 50). Where WBMS 1 is applied to, for example and without limitation, an EV, the master processor 15 may be further operatively (e.g., communicably) coupled to an ECU (not shown in FIG. 2) by way of a communications interface 17 such as a CAN bus.

WBMS 1 may include a plurality (n) of battery cells (e.g., 50-1, 50-2, . . . , 50-n) with respectively coupled battery modules (e.g., 30-1, 30-2, . . . , 30-n). Each battery module 30 in WBMS 2 may include at least one battery monitor 35 having functions and features similar to as described above with reference to FIG. 1. As described below in further detail with reference to FIGS. 4 and 5, each of the battery modules 30-1, . . . 30-n of WBMS 1 may serve as slaves to master processor 15. As illustrated in FIG. 2, the circuit board or IC 10 may a main (e.g., master) node of a wireless communication network, with 8 subordinate (e.g., slave) nodes embodied in battery modules 30-1, 30-2, . . . , 30-n in the network (e.g., n=8). The architecture of FIG. 2 is but one example and other architectures are possible.

In some embodiments, master processor 15 may also be operatively (e.g., communicably) coupled by way of wired connections (not shown in FIG. 2) to a load 25 including an electric motor "M" and associated motor driver and/or sensor electronics (not shown in FIG. 2). In other embodiments, load 25 may be operatively coupled to an ECU or similar component separate and apart from circuit board or integrated circuit 10 having master processor 15 for control of the motor, for instance.

The main processor 15 of WBMS 1 may be further operatively (e.g., communicably) coupled to battery monitor(s) 35 of battery modules 30 by way of wireless communication links 55 between the master transceiver 20 and slave transceivers 40 having associated RF antennas 45. The wireless communication links 55 between master processor 15 and the battery monitors 35 may enable reporting, logging and monitoring of battery cell 50-related data to, for instance, an ECU of an EV to facilitate maintaining the battery cells 50 and thus also the EV in good working order. Notably, as compared to the BMS 2 of FIG. 1, the master processor 15 in some embodiments need not be positioned in or on a portion of the wider WBMS 1 that provides isolation from a higher voltage due to the absence of wired communication links 55.

In WBMS 1, battery monitors 35 associated with each battery module 30 may wirelessly report voltage, temperature, and additional register settings to the main processor 15. In some embodiments, battery monitor(s) 35 of a particular battery module 30 may transmit such data to a respectively associated slave transceiver 40 using a wired data communication protocol such as serial universal asynchronous receiver-transmitter (UART). The main processor 15 may wirelessly send battery cell 50 balancing commands or other maintenance commands for the individual cells 50 or a group of cells 50 and the battery health monitoring devices which may be included in battery monitors 35. In WBMS 1, typical operational requirements for bandwidth may be 600 kbps, under 100 ms data latency, better than 10-5 packet error rate (PER), and power consumptions of less than 1 mA at the main node (e.g., circuit board or IC 10) and less than 300 μA at other nodes (e.g., battery modules 30).

Figure 3:
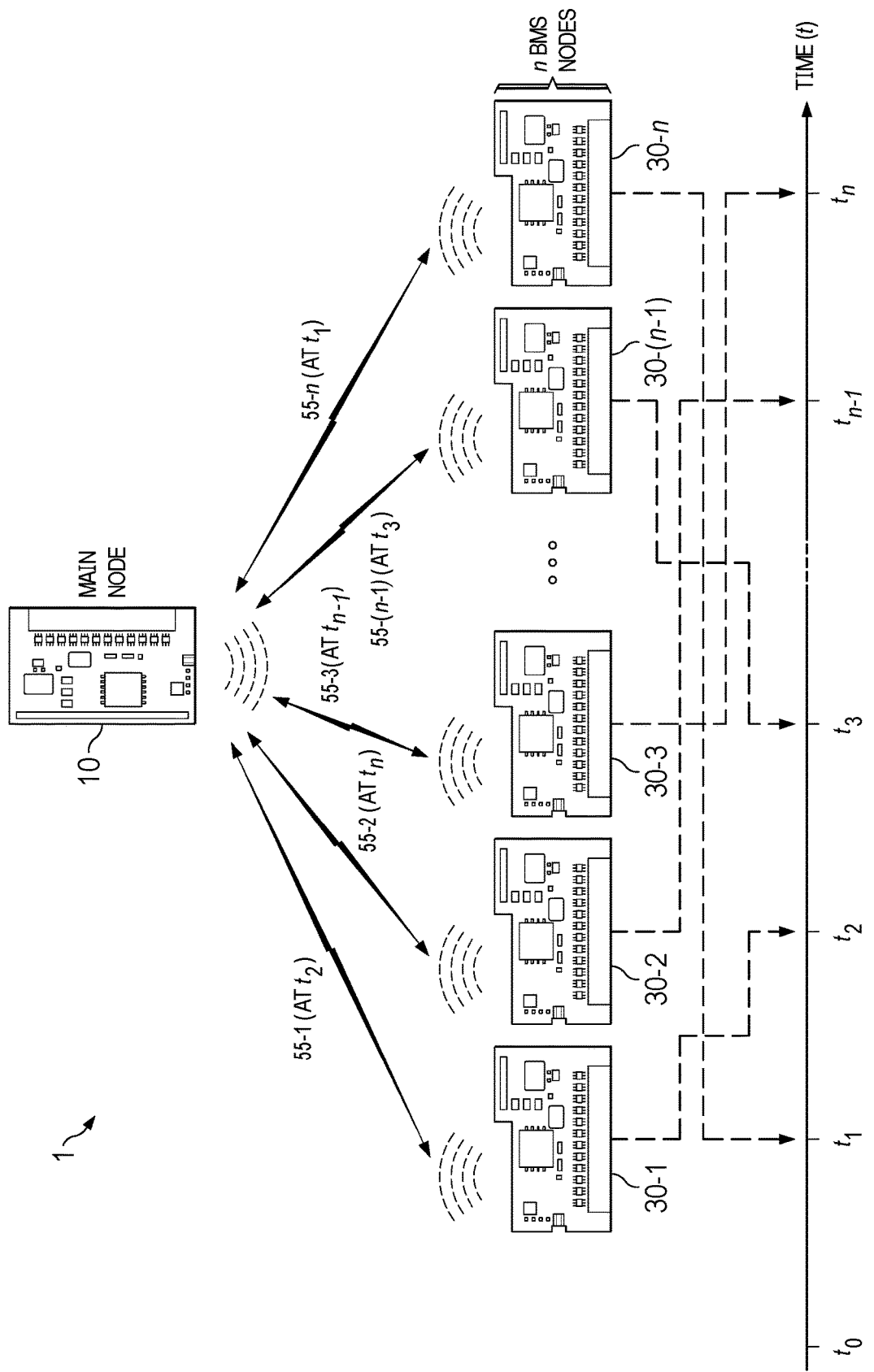
FIG. 3 is a schematic diagram of a known implementation.

FIG. 3 is a schematic diagram of the WBMS 1 of FIG. 2 according to a known implementation. A network configuration of WBMS 1 in FIG. 3 is an n-node WBMS network. In this network configuration, all of the n slave nodes (e.g., battery modules 30-1, 30-2, 30-3, ..., 30-(n−1), and 30-n) are unidentifiably wirelessly connected to the master node (e.g., circuit board or IC 10). As such, each of the n slave nodes 30 are assigned a unique time slot at random by the main node (e.g., processor 16, or controller, of circuit board or IC 12). So, upon a commencement of network formation at to in WBMS 1 according to the known implementation, wireless communication links 55 are established without a consecutive or other specifically assigned time ordered scheme that could be used for uniquely identifying each of the slave nodes 30 to the main or master node 10, and thus also to a user of WBMS 1 (e.g., EV maintenance technician).

For example, and without limitation, a first slave node 30-1 could establish wireless communication link 55-1 with main node 10 at time $t_2$, a second slave node 30-2 could establish link 55-2 with main node 10 at time $t_n$, a third slave node 30-3 could establish link 55-3 with main node 10 at time $t_{n-1}$, an (n−1)-th slave node 30-(n−1) could establish link 55-(n−1) with main node 10 at time $t_3$, and an n-th slave node 30-n could establish link 55-n with main node 10 at time $t_1$. Since the network formation for the known WBMS 1 configuration of FIG. 3 is completely random, a consecutive ordering from the first slave node 30-1 through the n-th slave node 30-n for the network formation taking place from time $t_1$ through time $t_n$ would occur by chance alone. As each of the slave nodes 30-1, ..., 30-n is given a unique time slot only at random in the wireless network configuration of FIG. 3 when the network is formed, the main processor 15 of the master node 10 (and thus also a user of WBMS 1) may be unable to easily match data or debug physical devices (e.g., battery cell(s) 50) from node time slot information alone. This may be detrimental in terms of, for example, an amount of time and effort it takes a maintenance technician of an EV to identify slave nodes 10 and associated battery cell(s) 50 and/or battery monitor(s) 35 requiring repair or replacement. Such issues may increase costs to owners of EVs requiring maintenance.

Network interference may also be a problem for WBMS 1 in the known implementation shown in FIG. 3. The placement of the slave nodes 30-1, ..., 30-n in relation to the main node 10 can impact the received signal strength and thus also wireless communication between the slave nodes 30 and the master node 10. Partial or whole network performance could be compromised for nodes' 30 and 10 placement in the wider context of, for example and without limitation, an EV. Additionally, or instead, PER, throughput, latency, and other wireless communication and data processing performance metrics may be sensitive to particular physical locations of slave nodes 30 in relation to a position of the main node 10 in WBMS 1.

Figure 4:
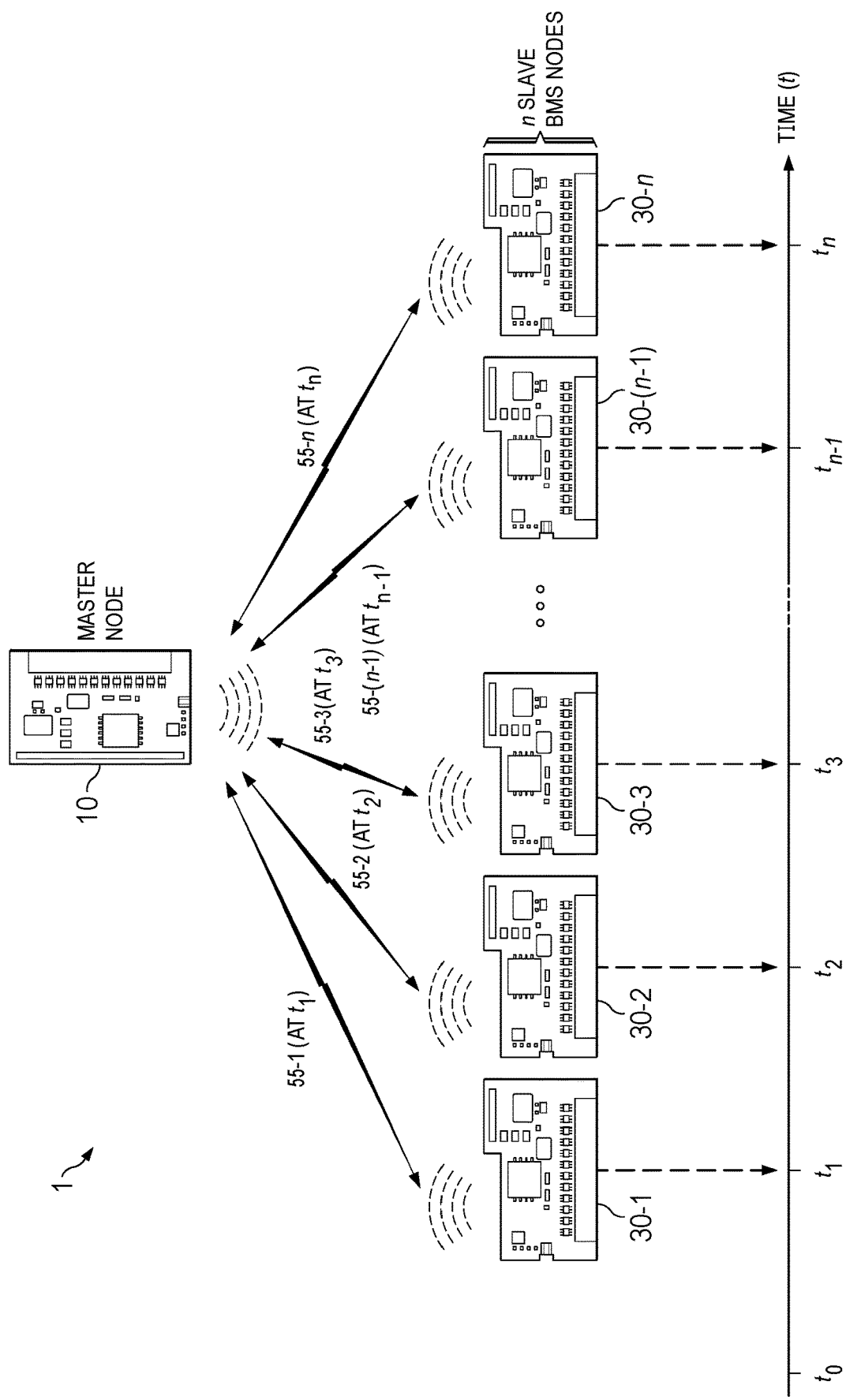
FIG. 4 is a schematic diagram of an implementation.

FIG. 4 is a schematic diagram of the WBMS 1 of FIG. 2 according to an implementation of the present technology. A network configuration of WBMS 1 in FIG. 4 is embodied in a single wireless network as between the master node 10 and the n slave nodes in a superframe scheme. In this network configuration, all of the n slave nodes 30 may be individually paired with the master node 10 through a specifically (e.g., predetermined or assigned) time ordering of establishment of the respective wireless communication links 55. Effectively, the single network can be setup separately in the superframe scheme, with one downlink and one uplink allocated to respectively slotted times. This time slot ordering may be consecutive, where wireless communication links (e.g., 55-1, 55-2, 55-3, ..., 55-(n−1), 55-n) for each slave node (e.g., 30-1, 30-2, 30-3, ..., 30-(n−1), 30-n) are established in the predetermined or assigned consecutive order every time the wireless network is formed in WBMS 1. This scheme can also be advantageously applied in cases where the master node 10 and slave nodes 30 are wired together for forming a communications network. In either the wireless or wired connection, this ensures that the master processor 15 of the master node 10—and thus also a user of WBMS 1—can uniquely identify respective slave nodes 30 of the n slave nodes and thereby specifically tie the data being reported by them with the associated battery cell(s) 50 and/or monitor(s) 35. Although the slave nodes 30-1, ..., 30-n are shown as being positioned in a physical sequential order in FIG. 4, it is to be understood that this may not reflect an actual ordered physical positioning of nodes 30 in practice of WBMS 1 in a real-world implementation according to the present technology. Rather, the horizontal physical ordering of slave nodes 30 shown in FIG. 4 is merely for ease of presentation in relation to the progression of time (t).

The network configuration for WBMS 1 shown in FIG. 4 is a time slotted channel hopping scheme. As compared to the known implementation of FIG. 3, however, the implementation according to the present technology is not randomly ordered with respect to the timing of wireless communication links 55-1, ..., 55-n. Therefore, upon commencing wireless network formation for WBMS 1 at $t_0$, the first slave node 30-1 establishes link 55-1 with master node 10 at time (or in time slot) $t_1$, the second slave node 30-2 establishes link 55-2 with master node 10 at time (or in time slot) $t_2$, the third slave node 30-3 establishes link 55-3 with master node 10 at time (or in time slot) $t_3$, the (n−1)-th slave node 30-(n−1) establishes link 55-(n−1) with master node 10 at time (or in time slot) $t_{n-1}$, and the n-th slave node 30-n establishes link 55-n with master node 10 at time (or in time slot) $t_n$. Since the network formation for the WBMS 1 configuration of FIG. 4 is not random, a consecutive ordering from the first slave node 30-1 through the n-th slave node 30-n for the communication links formation taking place from time $t_1$ through time $t_n$ occurs in a specified predetermined ordering of time slots for slave nodes 30-1, ..., 30-n.

As each of the slave nodes 30-1, ..., 30-n is given a unique time slot according to the predetermined consecutive ordering in the wireless network configuration of FIG. 4, the main processor 15 of the master node 10 (and thus also a user of WBMS 1) may be able to easily match data or debug physical devices (e.g., battery cell(s) 50) from a specified slave node 10 time slot assignment. This may be technically and practically advantageous as compared to the known implementation discussed above with reference to FIG. 3 in terms of, for example, an amount of time and effort it takes an EV maintenance technician to identify specific slave nodes 30 of the n slave nodes 30, and their associated battery cell(s) 50 and/or battery monitor(s) 35, requiring repair or replacement. Such benefits may flow to owners of EVs requiring maintenance in the form of reduced costs in terms of time and money.

Furthermore, ease of identification of slave nodes 30 and battery monitor 35 data may simplify operations and processes of main processor 15 as well as, for instance, EV processes as may be performed by an ECU. As such, the WBMS 1 according to the implementation of FIG. 4 may provide greater efficiencies in terms of computing, communications and memory resource utilization as compared to the known implementation of FIG. 3. Moreover, the WBMS 1 implementation of FIG. 4 enables users thereof to address any network interference issues more easily as compared to the known implementation of FIG. 4.

As each slave node 30 in FIG. 4 may be uniquely identified according to which time slot (e.g., assigned by processor 15, or controller, of IC 10) is used for establishing the wireless communication link 55 each and every time the wireless network is formed, wireless communication performance metrics like received signal strength indication (RSSI), PER, throughput, latency, among others, may be determined for respective slave nodes 30 having known positions in WBMS 1 in relation to master node 10. Accordingly, the WBMS 1 implementation according to the present technology as shown in FIG. 4 enables users to optimize positioning of slave nodes 30 with respect to master node 10 to thereby optimize the aforementioned wireless communication metrics.

Instead of forming an n-node WBMS network as in the known implementation shown in FIG. 3 with all of the n slave nodes 30 unidentifiably connected to the master node 10, the WBMS 1 implementation of FIG. 4 can form the wireless network with the master node 10 and the n slave nodes 30, commencing with the formation of the first wireless communication link 55-1 between slave node 30-1 and master node 10 in the WBMS 1 implementation of FIG. 4. The process repeats consecutively and in a predetermined or assigned time order until the n-th wireless communication link 55-n between slave node 30-n and master node 10 is established in the WBMS 1 implementation of FIG. 4. The knowledge of the slave nodes' 30 specifically assigned time slots in the wireless network formation for WBMS 1 according to the present technology ensures the identification of any respective slave node 30 paired with the master node 10. This can be used to quickly and easily extract information with respect to location of the slave node 30 and its wireless communication performance, e.g., RSSI, PER, retransmissions, delay experiences and other parameters for the node 10 at that particular location. This information can be used to identify the optimum location for any or all of the n slave nodes 10.

Figure 5:
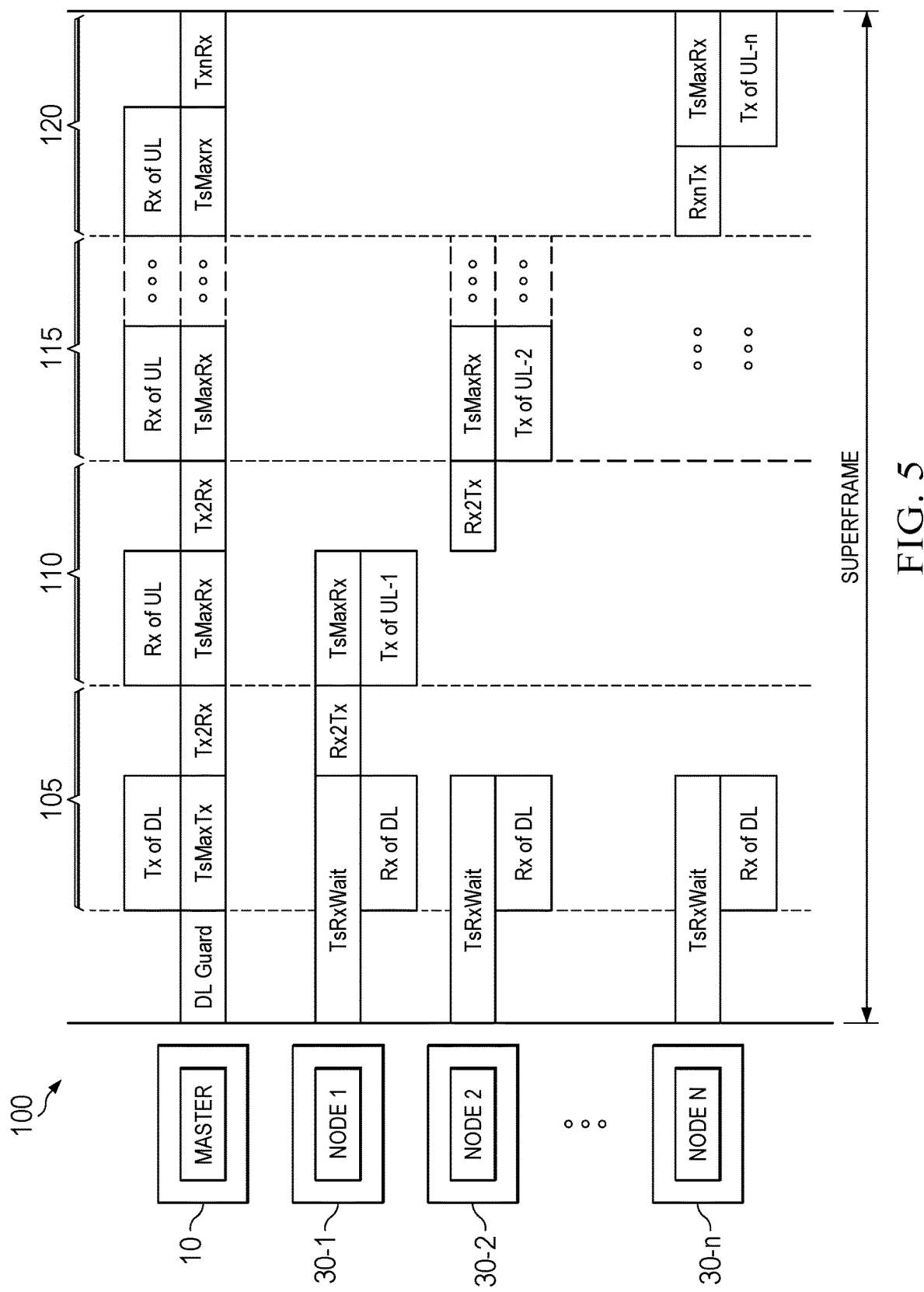
FIG. 5 is a timing diagram of an implementation.
Figure 6:
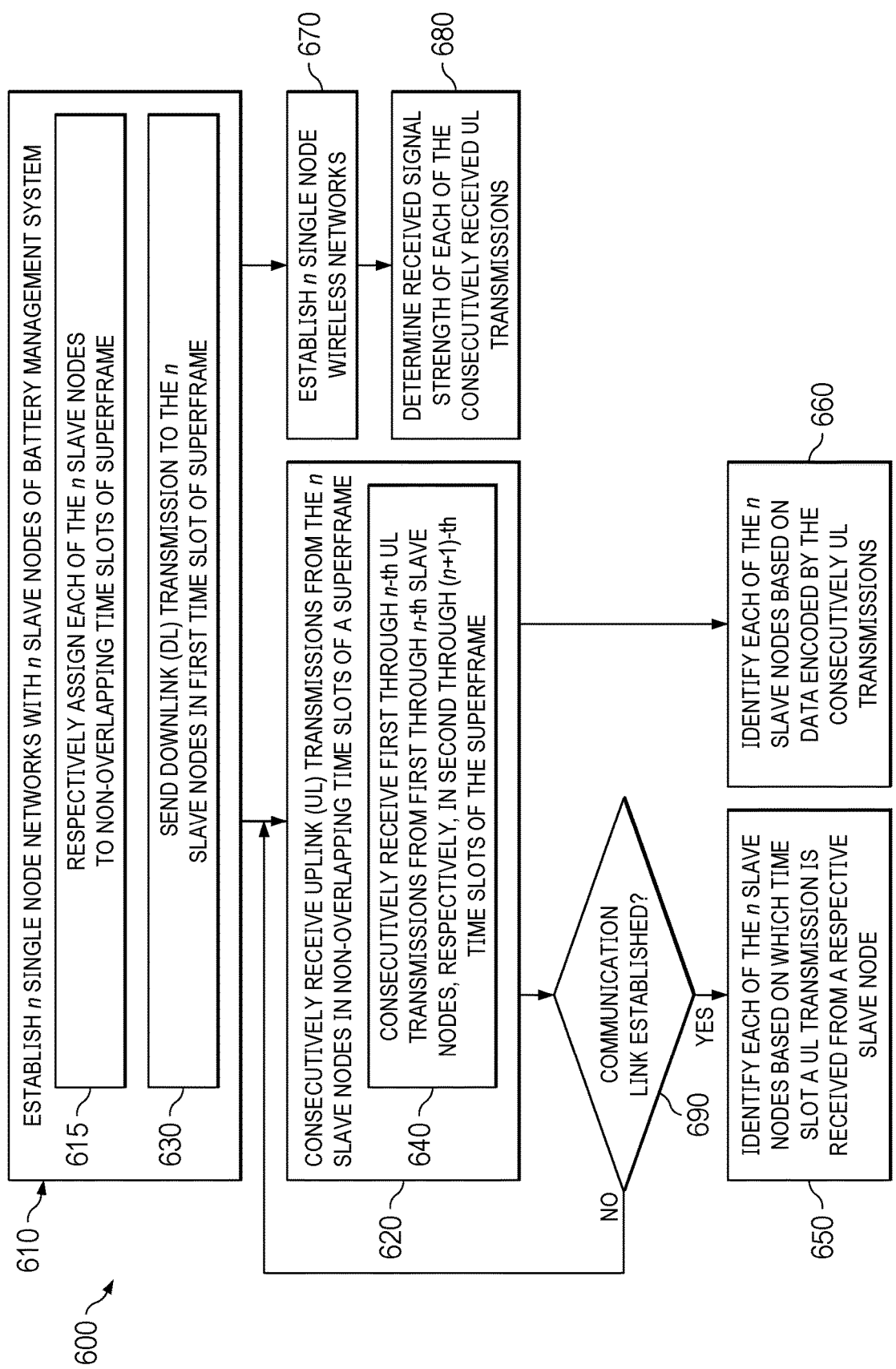
FIG. 6 is an operational sequence of an implementation.

FIG. 5 is a timing diagram providing additional details relating to the implementation of the BMS 1 as shown in FIG. 4 according to an implementation of the present technology. FIG. 6 is an operational sequence of a method 600 of operating a BMS according to an implementation of the present technology. With reference to FIGS. 5 and 6, and further to FIGS. 2 and 4, method 600 may include the step of establishing 610 (e.g., by processor 15 or controller) a communications network between master node 10 and the n slave nodes 30 of the BMS. The establishing 610 step of method 600 may include respectively assigning 615 (e.g., by processor 15, or controller, of master node 10) each of the n slave nodes 30 to non-overlapping time slots (e.g., 110, 115, 120) of a superframe 100. Method 600 may further include the step of consecutively receiving 620, e.g., by the master transceiver 20 of master node 10 and via communication links 55, uplink (UL) transmissions from the n slave nodes 30 in the non-overlapping time slots of superframe 100. As described above with reference to FIG. 4, for example, establishing 610 the communications network between the n slave nodes 30 and the master node 10 according to the present technology facilitates identification of individual slave nodes and their associated data reporting in operation of the BMS.

In some embodiments, the establishing 610 step of method 600 may include sending 630, e.g., by master transceiver 20 of the master node 10 and via communication links 55-1, . . . , 55-n, a downlink (DL) transmission to at least a first slave node 30-1 of the n slave nodes 30 in a first time slot 105 of the non-overlapping time slots of the superframe 100. In one embodiment, the DL transmission may be received by slave transceivers 40 of each of the n slave nodes (e.g., 30-1, 30-2, . . . , 30-n) in the first time slot 105 of superframe 100. In another embodiment, the DL transmission may be received individually and consecutively by slave transceivers 40 of each of the n slave nodes (e.g., 30-1, 30-2, . . . , 30-n) in the consecutive time slots (e.g., 105, 110, 115, 120) of superframe 100. In an example implementation of method 600, the consecutively receiving 620 step may include consecutively receiving 640, e.g., by master transceiver 20 of the master node 10 and via communication links 55-1, . . . , 55-n, first through n-th uplink (UL) transmissions from first (30-1) through n-th (30-n) slave nodes 30, respectively, in second (110) through (n+1)-th (120) time slots of the non-overlapping time slots of the superframe 100.

In some embodiments, method 600 may additionally include the step of identifying 650 each of the n slave nodes 30 based on which time slot of the non-overlapping time slots of the superframe 100 that a UL transmission is received 620 from a respective slave node 30 of the n slave nodes 30. In method 600, the UL transmissions may be transmitted from the n slave nodes by respective slave transceivers 40 of the BMS in a consecutive order according to the predetermined assignment of slave nodes 30-1, . . . , 30-n to time slots of the superframe 100, as shown in FIG. 5. These time slot assignments may be stored in memory storage device(s) of slave nodes 30 and/or the master node 10. In other embodiments, method 600 may additionally, or instead, include the step of identifying 660 each of the n slave nodes 30 based on data (e.g., a unique identifier) encoded by the consecutively received 620 UL transmissions 55.

In some embodiments, method 600 may include a logical branch 690 whereby processor(s) or controller(s) of master node 10 and/or slave nodes 30-1, . . . , 30-n may determine whether or not a respective communication link 55 (e.g., wired or wireless) is established 610. In the example illustrated in FIG. 6, logical branch 690 operations occur between the receiving 620 step and the identifying 650 step. In other embodiments (not shown in FIG. 6), logical branch 690 operations may occur before the receiving 620 step of method 600, either instead of, or in addition to, the process sequence for logical branch 690 depicted in FIG. 6.

As described in greater detail above, embodiments of the present technology may utilize wireless communication protocols such as WiFi, Bluetooth, BLE and the like, for a wireless BMS (WBMS). In these wireless embodiments according to the present technology, the communication links 55 may be wireless communication links 55, and the master 20 and slave 40 transceivers may be wireless transceivers. In such cases, method 600 may be a method of operating a WBMS, and the establishing 610 may further include establishing 670 the communications network may include establishing the communications network as a wireless communications network, e.g., via wireless communications links 55-1, . . . , 55-n.

In embodiments of method 600 according to the present technology that advantageously utilize wireless (e.g., RF) communications protocols between the master node 10 and the n slave nodes 30-1, . . . , 30-n, the various nodes (10 and/or 30) may monitor, record, log and/or track performance metrics of the wireless communication, as described in greater detail above, for use in, among other applications, optimizing location(s) of slave node(s) 30-1, . . . , 30-n in relation to a position of the master node 10. In some such embodiments, the method 600 may further include the step of determining 680 a received signal strength (e.g., as a measured RSSI) of each of the consecutively received UL transmissions over wireless communications links 55-1, . . . , 55-n to facilitate optimization by a user of the WBMS of a location of each of the n slave nodes 30-1, . . . , 30-n relative to the master node 10.

Figure 7:
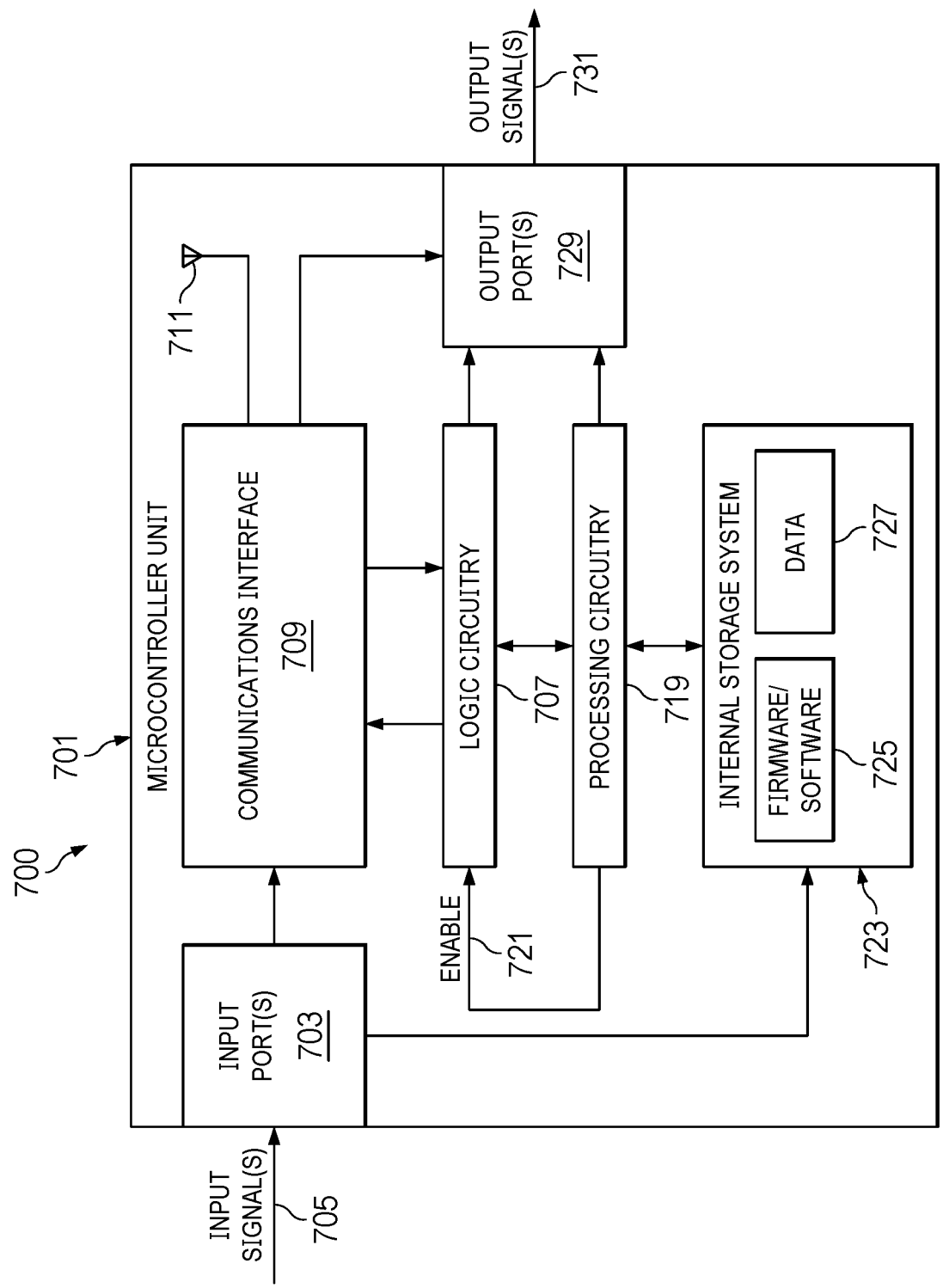
FIG. 7 is a functional view of a system suitable for implementing an implementation.

FIG. 7 illustrates computing system 700 that is representative of any system or collection of systems in which the various processes, programs, services, and scenarios disclosed herein may be implemented. Examples of computing system 700 include, but are not limited to, microprocessors, integrated circuits, system-on-a-chip (SoC), server computers, routers, web servers, cloud computing platforms, and data center equipment, as well as any other type of physical or virtual server machine, physical or virtual router, container, and any variation or combination thereof. In one embodiment, as shown in FIG. 7, the electronic circuit (e.g., IC 10 including the master node) may be at least in part embodied in a microcontroller 701 configured to provide at least a portion of the functionality of IC 10 and/or method 600 according to the present technology, as described above.

As described above, microcontroller unit 701 may take on any of a wide variety of configurations. Here, a simplified example configuration is provided for an electronic circuit (e.g., IC 10) including processor(s) 15 as described above and embodied in microcontroller unit 701. In the embodiment shown in FIG. 7, microcontroller unit 701 may include input port(s) 703 which may correspond to pin(s) of IC 10. Input port(s) 703 may include circuitry configured to receive input signal(s) 705 from source(s) external to microcontroller unit 701, such as data representative of firmware instructions for use by the master node according to the present technology.

Microcontroller unit 701 may include logic circuitry 707 operably coupled to input port(s) 705 to receive input signal(s) 705 therefrom. In some embodiments, input signal(s) 705 may be transmitted via input port(s) 703 to logic circuitry 707 by way of one or more intervening functional components of microcontroller unit 701. In the example illustrated in FIG. 7, such intervening components may include a communications interface 709 coupled to and between input port(s) 703 and logic circuitry 707. Communications interface 709 may have the functionality of a wired and/or wireless transceiver. In an example, a radio frequency antenna 711 is coupled to communications interface 709 to provide wireless (e.g., WiFi) communications according to the present technology. Logic circuitry 707 may include, or be coupled to, processing circuitry 719. Logic circuitry 707 and/or processing circuitry 719 may be configured to implement or otherwise perform, at least in part, one or more of the functions of the IC 10 and/or method 600 according to the present technology.

In microcontroller unit 701, processing circuitry 719 may be operably coupled to logic circuitry 707. In some embodiments, processing circuitry 719 may correspond to processor(s) 15, or controller, IC 10 as described above. Processing circuitry 719 may include analog and/or digital circuitry components capable of directing logic circuitry 717 and other components of microcontroller unit 701 to implement or otherwise perform, at least in part, one or more of the functions of the IC 10 and/or method 600 according to the present technology. Processing circuitry 719 may also transmit an enable signal(s) 721 to logic circuitry 707 activate all or part of the functionality of the components of microcontroller unit 701. In an example embodiment, receipt of enable signal(s) 721 by logic circuitry 707 may correspond to master node 10 being powered on for use in method 600.

Microcontroller unit 701 may include an internal storage system 723 operably coupled to processing circuitry 719. Processing circuitry 719 may include microprocessor(s) and other circuitry that retrieves and executes firmware and/or software 725 instruction code stored in internal storage system 723 (e.g., on or in non-transitory computer readable media). Examples of processing circuitry 719 include, for example and without limitation, general purpose central processing units, application specific processors, and logic devices, as well as any other type of processing device, combinations, or variations thereof. Processing circuitry 719 can be implemented within a single processing device but can also be distributed across multiple processing devices or sub-systems that cooperate in executing program instructions.

Internal storage system 723 can comprise any non-transitory computer readable storage media capable of storing firmware and/or software 760 that is executable by processing circuitry 719. Internal storage system 723 can also include various data structures 727 which comprise one or more registers, databases, tables, lists, or other data structures. Storage system 723 can include volatile and nonvolatile, removable and non-removable media implemented in any method or technology for storage of information, such as computer readable instructions, data structures, program modules, or other data. In this example embodiment, internal storage system 723 includes flash memory within microcontroller unit 701 which also stores configuration (e.g., non-overlapping time slots respectively assigned to the n slave nodes 30).

Storage system 723 can be implemented as a single storage device but can also be implemented across multiple storage devices or sub-systems co-located or distributed relative to each other. Storage system 723 can comprise additional elements, such as a controller, capable of communicating with processing circuitry 719. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Firmware and/or software 725 can be implemented in program instructions and among other functions can, when executed by microcontroller unit 701 in general or processing circuitry 719 in particular, direct microcontroller unit 701, or processing circuitry 719, to operate as described herein according to the present technology. Firmware and/or software 725 can include additional processes, programs, or components, such as operating system software, database software, or application software. Firmware and/or software 760 can also include firmware or some other form of machine-readable processing instructions executable by elements of processing circuitry 719. In at least one example implementation, the program instructions include various modules configured to direct processing circuitry 719 and/or logic circuitry 707 to at least partially implement or otherwise perform the functionality of IC and processes of method 600.

In general, firmware and/or software 725 can, when loaded into processing circuitry 719 and executed, transform processing circuitry 719 overall from a general-purpose computing system into a special-purpose computing system customized to operate as described herein for a microcontroller unit 701 according to the present technology. Encoding firmware and/or software 725 on internal storage system 723 can transform the physical structure or state of internal storage system 723. The specific transformation of the physical structure or state can depend on various factors in different implementations of this description. Examples of such factors can include, but are not limited to the technology used to implement the storage media of internal storage system 723 and whether the computer-storage media are characterized as primary or secondary storage.

For example, if the computer-storage media are implemented as semiconductor-based memory, firmware and/or software 725 can transform the physical state of the semiconductor memory when the program is encoded therein. For example, firmware and/or software 725 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

At least one output signal(s) 731 encoding data representative of results of, e.g., arithmetical, operations performed by processing 719 and/or logic 707 circuitry may be transmitted outside of microcontroller unit 701 via one or more output ports 729 by communications interface 709. In some embodiments, communications interface 709 may take the aforementioned signal(s) 731 from logic circuitry 707 and subsequently cause them to be transmitted out of microcontroller unit 701 via output port(s) 729. In other embodiments, logic circuitry 707 and/or processing circuitry 719 includes at least a part of the functionality of communications interface 709 and, as such, the aforementioned signal(s) 731 may be transmitted directly outside of microcontroller 701 by logic circuitry 707 and/or processing circuitry 719 via output port(s) 729.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A battery management system (BMS) comprising:
   a master node including a master transceiver and a controller communicably coupled to the master transceiver; and
   a plurality (n) of slave nodes, each slave node of the n slave nodes including a slave transceiver configured to be communicably coupled to at least one battery monitor, wherein the controller is configured to direct the master transceiver to:
   establish a communications network in accordance with a wireless communication protocol;
   establish, over the communications network, a plurality of (n) single-node communication links based on a predetermined ordering of a superframe, wherein each single-node communication link of the n single-node communication links includes the master transceiver and one of the n slave nodes;
   assign each of the n slave nodes to non-overlapping time slots of the superframe; and
   consecutively receive uplink (UL) transmissions from the n slave nodes, by the n single-node communication links, over the communications network and in the non-overlapping time slots of the superframe.

2. The BMS of claim 1, wherein the controller is further configured to direct the master transceiver to send a downlink (DL) transmission to at least a first slave node of the n slave nodes in a first time slot of the nonoverlapping time slots of the superframe.

3. The BMS of claim 2, wherein to consecutively receive the UL transmissions from the n slave nodes, the controller is further configured to direct the master transceiver to consecutively receive first through n-th UL transmissions from first through n-th slave nodes, respectively, in second through (n+1)-th time slots of the nonoverlapping time slots of the superframe.

4. The BMS of claim 1, wherein the controller is further configured to identify each of the n slave nodes based on which time slot of the non-overlapping time slots of the superframe that a UL transmission is received from a respective slave node of the n slave nodes.

5. The BMS of claim 1, wherein the controller is further configured to identify each of the n slave nodes based on data encoded by the consecutively received UL transmissions.

6. The BMS of claim 1, wherein the master and slave transceivers are wireless transceivers, and wherein the BMS is a wireless BMS (WBMS).

7. The BMS of claim 6, wherein the controller is further configured to determine a received signal strength of each of the consecutively received UL transmissions to facilitate optimization by a user of the WBMS of a location of each of the n slave nodes relative to the master node.

8. A method of operating a battery management system (BMS), comprising:
   establishing a communications network between a master node and a plurality of (n) slave nodes, of the BMS, wherein the master node includes a master transceiver, and wherein establishing the communications network is in accordance with a wireless communications protocol;
   establishing, over the communications network, a plurality of (n) single-node communication links based on a predetermined ordering of a superframe, wherein each single-node communication link of the n single-node communication links includes the master transceiver and one of the n slave nodes;

assigning each of the n slave nodes to nonoverlapping time slots of the superframe; and consecutively receiving, by the master node, uplink (UL) transmissions from the n slave nodes, by the n single-node communication links, over the communications network and in the non-overlapping time slots of the superframe.

9. The method of claim 8, further comprising sending, by the master node, a downlink (DL) transmission to at least a first slave node of the n slave nodes in a first time slot of the non-overlapping time slots of the superframe.

10. The method of claim 9, wherein the consecutively receiving comprises consecutively receiving, by the master node, first through n-th UL transmissions from first through n-th slave nodes, respectively, in second through (n+1)-th time slots of the non-overlapping time slots of the superframe.

11. The method of claim 8 further comprising identifying each of the n slave nodes based on which time slot of the non-overlapping time slots of the superframe that a UL transmission is received from a respective slave node of the n slave nodes.

12. The method of claim 8 further comprising identifying each of the n slave nodes based on data encoded by the consecutively received UL transmissions.

13. The method of claim 8, wherein the UL transmissions are wirelessly transmitted from the n slave nodes to the master node, and wherein the establishing comprises establishing the plurality of n single-node communication links as a plurality of (n) single-node wireless communication links.

14. The method of claim 13, wherein the BMS is a wireless BMS (WBMS), the method further comprising determining a received signal strength of each of the consecutively received UL transmissions to facilitate optimization by a user of the WBMS of a location of each of the n slave nodes relative to the master node.

15. One or more non-transitory computer readable media having stored thereon program instructions which when executed by at least one processor, cause a machine to:

establish a communications network between a master node and a plurality of (n) slave nodes, of a battery management system (BMS), wherein the master node includes a master transceiver, and wherein the communications network is established in accordance with a wireless communications protocol;

establish, over the communications network, a plurality of (n) single-node communication links based on a predetermined ordering of a superframe, wherein each single-node communication link of the n single-node communication links includes the master transceiver and one of the n slave nodes;

assign each of the n slave nodes to non-overlapping time slots of the superframe; and consecutively receive, by the master node, uplink (UL) transmissions from the n slave nodes, by the n single-node communication links, over the communications network and in the non-overlapping time slots of the superframe.

16. The one or more non-transitory computer readable media of claim 15, wherein the program instructions further cause the machine to direct the master node to send a downlink (DL) transmission to at least a first slave node of the n slave nodes in a first time slot of the non-overlapping time slots of the superframe.

17. The one or more non-transitory computer readable media of claim 16, wherein when executed by the at least one processor, the program instructions further cause the machine to direct the master node to consecutively receive, after the DL transmission is sent, first through n-th UL transmissions from first through n-th slave nodes, respectively, in second through (n+1)-th time slots of the nonoverlapping time slots of the superframe.

18. The one or more non-transitory computer readable media of claim 15, wherein when executed by the at least one processor, the program instructions further cause the machine to uniquely identify each of the n slave nodes based on which time slot of the non-overlapping time slots of the superframe that a UL transmission is received from a respective slave node of the n slave nodes.

19. The one or more non-transitory computer readable media of claim 15, wherein the UL transmissions are wirelessly transmitted from the n slave nodes to the master node, and wherein when executed by the at least one processor to establish the plurality of n single-node communication links, the program instructions further cause the machine to establish the plurality of n single-node communication links as a plurality of (n) single-node wireless communication links.

20. The one or more non-transitory computer readable media of claim 19, wherein the BMS is a wireless BMS (WBMS), and wherein when executed by the at least one processor, the program instructions further cause the machine to determine a received signal strength of each of the consecutively received UL transmissions.

* * * * *